US012597300B2

(12) United States Patent
Schmitt et al.

(10) Patent No.: US 12,597,300 B2
(45) Date of Patent: Apr. 7, 2026

(54) INTEGRATED VEHICLE HEALTH MANAGEMENT SYSTEMS AND METHODS USING AN ENHANCED FAULT MODEL FOR A DIAGNOSTIC REASONER

(71) Applicant: STEERING SOLUTIONS IP HOLDING CORPORATION, Saginaw, MI (US)

(72) Inventors: Peter D. Schmitt, Farmington Hills, MI (US); Joachim J. Klesing, Rochester, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 253 days.

(21) Appl. No.: 17/950,447

(22) Filed: Sep. 22, 2022

(65) Prior Publication Data

US 2023/0097155 A1 Mar. 30, 2023

Related U.S. Application Data

(60) Provisional application No. 63/248,118, filed on Sep. 24, 2021.

(51) Int. Cl.
*G07C 5/08* (2006.01)

(52) U.S. Cl.
CPC ......... *G07C 5/0808* (2013.01); *G07C 5/0841* (2013.01)

(58) Field of Classification Search
CPC ............................ G07C 5/0808; G07C 5/0841
See application file for complete search history.

(56) References Cited

U.S. PATENT DOCUMENTS

| | | | | |
|---|---|---|---|---|
| 2015/0081729 A1* | 3/2015 | Rajpathak | ............. | G06F 16/284 707/758 |
| 2015/0360715 A1* | 12/2015 | Shimizu | ............... | B62D 5/0484 701/43 |
| 2017/0213222 A1* | 7/2017 | Rajpathak | ............. | G06F 40/216 |
| 2020/0372729 A1* | 11/2020 | Duan | ....................... | G07C 5/08 |

(Continued)

FOREIGN PATENT DOCUMENTS

| | | |
|---|---|---|
| CN | 102046443 A | 5/2011 |
| CN | 104160428 A | 11/2014 |

(Continued)

OTHER PUBLICATIONS

China National Intellectual Property Administration (CNIPA), CN Office Action Application No. 202211176434.8, dated Jun. 27, 2025.

*Primary Examiner* — Justin S Lee
(74) *Attorney, Agent, or Firm* — Dickinson Wright PLLC

(57) ABSTRACT

A method for vehicle fault management includes generating, for a vehicle system, a fault model including a plurality of faults using design failure mode and effect analysis information and parsing each of the faults of the plurality of faults by subsystem of the vehicle system. The method also includes determining, for a respective fault of the plurality of faults, whether the respective fault is associated with at least one existing diagnostic trouble code based on fault code requirement information. The method also includes, in response to a determination that the respective fault is associated with at least one existing diagnostic trouble code, associating, in a fault database, the at least one existing diagnostic trouble code with the respective fault.

20 Claims, 6 Drawing Sheets

(56) References Cited

U.S. PATENT DOCUMENTS

| | | | | |
|---|---|---|---|---|
| 2020/0394850 | A1* | 12/2020 | Sankavaram .......... | G07C 5/008 |
| 2021/0312394 | A1* | 10/2021 | Friedland ......... | G06Q 10/06316 |
| 2021/0406105 | A1* | 12/2021 | Kymal ................. | G06Q 10/063 |
| 2022/0169264 | A1* | 6/2022 | Du ......................... | G07C 5/006 |

FOREIGN PATENT DOCUMENTS

| | | | | | |
|---|---|---|---|---|---|
| CN | 104516347 | A | | 4/2015 | |
| CN | 112711858 | A | * | 4/2021 | ............. G06F 30/20 |
| WO | WO-2017178902 | A1 | * | 10/2017 | ............ G01M 17/00 |

* cited by examiner

210

| System Function | Subsystem | Subsystem Function |
|---|---|---|
| Transmit input shaft position and torque to output shaft | Transmission | Provide mechanical path to transfer steering position from input shaft to output shaft |
| | | Provide mechanical path to transfer steering torque from input shaft to output shaft |
| Provide steering assist at the output shaft | Transmission | Magnify & transmit the motor torque to output shaft |
| | Input shaft torque sensor | Generate torque signal proportional to driver input torque |
| | Control Module | Provide proper current to the motor based on input shaft torque sensor |
| | Motor | Provide output torque proportional to the applied current |

TO FIG.4B

FIG. 4A

220

| Fault | Lash Indicator | Friction Indicator | Torque Output Indicator | Signal Integrity Indicator | Current Integrity Indicator | Motor Health Indicator |
|---|---|---|---|---|---|---|
| Excessive free play/lash | 1 | | | | | |
| Excessive friction/resistance | | 1 | | | | |
| Motor torque not fully transmitted to output shaft | | | 1 | | | |
| Incorrect/no signal | | | | 1 | | |
| Incorrect current send to motor | | | | | 1 | |
| Incorrect motor torque constant | | | | | | 1 |

FROM FIG.4A

FIG. 4B

INTEGRATED VEHICLE HEALTH MANAGEMENT SYSTEMS AND METHODS USING AN ENHANCED FAULT MODEL FOR A DIAGNOSTIC REASONER

CROSS-REFERENCES TO RELATED APPLICATIONS

This patent application claims priority to U.S. Provisional Patent Application Ser. No. 63/248,118, filed Sep. 24, 2021 which is incorporated herein by reference in its entirety.

TECHNICAL FIELD

This disclosure related to integrated vehicle health management and, in particular, to integrated vehicle health management systems and methods using an enhanced fault model for a diagnostic reasoner.

BACKGROUND

A vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, steer-by-wire (SbW) steering system, or other suitable steering system. The steering system of such a vehicle typically controls various aspects of vehicle steering including providing steering assist to an operator of the vehicle, controlling steerable wheels of the vehicle, and the like.

SUMMARY

This disclosure relates generally to integrated vehicle health management.

An aspect of the disclosed embodiments includes a method for vehicle fault management. The method includes generating, for a vehicle system, a fault model including a plurality of faults using design failure mode and effect analysis information and parsing each of the faults of the plurality of faults by subsystem of the vehicle system. The method also includes determining, for a respective fault of the plurality of faults, whether the respective fault is associated with at least one existing diagnostic trouble code based on fault code requirement information and, in response to a determination that the respective fault is associated with at least one existing diagnostic trouble code, associating, in a fault database, the at least one existing diagnostic trouble code with the respective fault.

Another aspect of the disclosed embodiments includes a system for vehicle fault management. The system includes a processor and a memory. The memory includes instructions that, when executed by the processor, cause the processor to: generate, for a vehicle system, a fault model including a plurality of faults using design failure mode and effect analysis information; parse each of the faults of the plurality of faults by subsystem of the vehicle system; determine, for a respective fault of the plurality of faults, whether the respective fault is associated with at least one existing diagnostic trouble code based on fault code requirement information; and, in response to a determination that the respective fault is associated with at least one existing diagnostic trouble code, associate, in a fault database, the at least one existing diagnostic trouble code with the respective fault.

Another aspect of the disclosed embodiments includes an apparatus for vehicle fault management. The apparatus includes a processor and a memory. The memory includes instructions that, when executed by the processor, cause the processor to: generate, for a vehicle system, a fault model including a plurality of faults using design failure mode and effect analysis information; parse each of the faults of the plurality of faults by subsystem of the vehicle system; determine, for a respective fault of the plurality of faults, whether the respective fault is associated with at least one existing diagnostic trouble code based on fault code requirement information; in response to a determination that the respective fault is associated with at least one existing diagnostic trouble code, associate, in a fault database, the at least one existing diagnostic trouble code with the respective fault; and, in response to a determination that the respective fault is not associated with at least one existing diagnostic trouble code, generate, using at least one of available data and a physics based model, diagnostic information for the respective fault, and associate the diagnostic information for the respective fault with the respective fault in the fault database.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 4A and 4B generally illustrate a preliminary EPS fault model example according to the principles of the present disclosure.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, steer-by-wire (SbW) steering system, or other suitable steering system. The steering system of such a vehicle typically controls various aspects of vehicle steering including providing steering assist to an operator of the vehicle, controlling steerable wheels of the vehicle, and the like.

Such a steering system may, periodically, experience various faults. During a design phase of the steering system, various fault diagnostic techniques may be employed to, at least, increase a likelihood of identifying a fault during production or use of the vehicle. For example, an integrated vehicle health management system may be used to identify faults during a design phase of the steering system.

Figure 3:
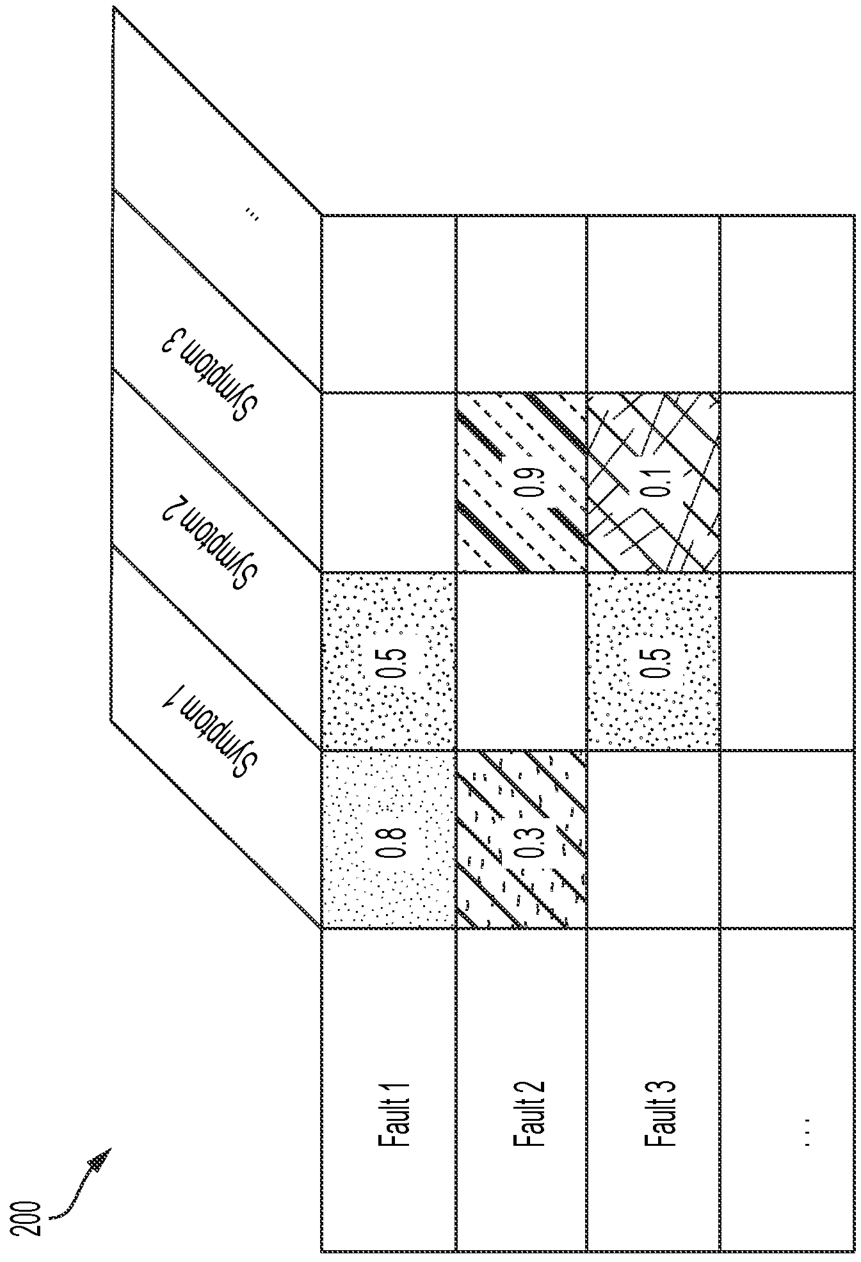
FIG. 3 generally illustrates fault model input to a diagnostic reasoner according to the principles of the present disclosure.

Integrated vehicle health management systems typically include, as a core component, a diagnostic reasoner. The diagnostic reasoner may be configured to determine a root cause or root fault of a fault or failure based on one or more symptoms present during the fault. Diagnostic reasoners generally use a Bayesian belief network or equivalent probabilistic approach. FIG. 3 generally illustrates an example input fault model for the diagnostic reasoner. Each element of a table 200 may represent a probability that a given symptom will be present if a fault is present (e.g., which may also be considered the probability of detection). The diagnostic reasoner may evaluate the symptoms that are present and then use a probabilistic approach to determine which faults are most likely.

There are many challenges with such an approach to diagnostic reasoners. One such challenge includes an inherent ambiguity. For example, in the table 200, symptom 3 may be caused by fault 2 or by fault 3. Ultimately, this means that the diagnostic reasoner can, at best, identify a ranked list of likely causes rather than a single cause (e.g., which may require additional work by a technician to troubleshoot multiple potential root causes).

Another issue with the above described approach is that determining the probabilities is typically a difficult and, generally, a subjective process. For example, the model may be typically populated with initial estimates with the understanding that, during the life of the system, the probabilities will be updated based on real-world experience. This process is susceptible to a variety of noise factors, ranging from poor initial estimates to missing and/or incomplete real-world updates.

In addition, another issue with the above described approach is that generation of the list of potential faults is an ad hoc process (e.g., on the one hand leading to potentially missing faults, and on the other hand resulting in extremely large lists of faults for all but the simplest systems.

Accordingly, systems and methods, such as those described herein, configured to provide an enhanced fault model for a diagnostic reasoner, may be desirable. In some embodiments, the systems and methods described herein may be configured to reduce or eliminate a number of faults by managing faults at subsystem level, rather than component-level. The systems and methods described herein may be configured to automatically generate faults from system-level design failure mode and effect analysis (DFMEA) information (e.g., which may be associated with one or more of one or more documents, data, one or more electronic files, and the like). The systems and methods described herein may be configured to select symptoms that are uniquely associated with individual faults.

In some embodiments, the systems and methods described herein may be configured to reduce the number of potential faults. The systems and methods described herein may be configured to generate a symptom that uniquely captures a subsystem failure (e.g., which may be easier than generating a symptom that uniquely characterizes a component failure). The systems and methods described herein may be configured to simplify physics model-based techniques to fault detection (e.g., as the models only need to represent the subsystem overall behavior rather than being accurate to the component level).

In some embodiments, the systems and methods described herein may be configured to use the DFMEA to represent a complete and comprehensive list of failure modes (e.g., which may reduce or eliminate the likelihood of missing potential failure modes). The systems and methods described herein may be configured to provide potential automation opportunities, both within an organization as well as across different organizations (e.g., because the DFMEA approach is highly standardized).

In some embodiments, the systems and methods described herein may be configured to eliminate a need for a Bayesian approach (e.g., using, instead, various linear algebraic techniques). The systems and methods described herein may be configured to identify a single fault as the root cause (e.g., which may result in reduced trouble shooting possibilities).

In some embodiments, the systems and methods described herein may be configured to at least partially provide an automated process for fault model generation (e.g., using the system-level DFMEA information and fault information (e.g., indicating fault code requirements and which may be associated with one or more of one or more documents, one or more electronic files, and the like) as input). For example, as is generally illustrated in FIGS. 4A and 4B, a table 210 may represent a fault model for an EPS of a vehicle. The faults correspond to a subset of faults of the system-level DFMEA information. At 220, symptoms are shown, with at least some symptoms being based on existing diagnostic indicators (e.g., and are capable of achieving a 1:1 relationship with the subsystem faults).

In some embodiments, the systems and methods described herein may be configured to provide an improved approach to generating a fault model for complex systems to support the diagnostic reasoner in an integrated vehicle health management framework in which: the faults are generated from subsystem-level failures rather than component level failures to greatly reduce the number of faults; the faults are generated automatically from DFMEA information for completeness and efficiency; and symptoms are developed that are uniquely associated with each of the individual faults thereby eliminating complex probabilistic approaches. In some embodiments, the systems and methods described herein may be configured to generate the fault model at "run-time" (e.g., while vehicle is in production and capable of being operated) where the fault model is generated and information is parsed each time the vehicle system is in use. Additionally, or alternatively, the systems and methods described herein may be configured to generate the fault model and parse the information during a design phase (e.g., before the vehicle is manufactured or in production).

In some embodiments, the systems and methods described herein may be configured to generate, for a vehicle system, a fault model including a plurality of faults using design failure mode and effect analysis information. The vehicle system may include one or more active chassis systems such as an anti-lock braking system, an electronic stability control system, an active suspension system, an active damping system, an active stabilizer bar system, any other suitable active chassis system, a steering system (e.g., such as an EPS steering system, a SbW steering system, or any other suitable steering system), and/or any other suitable vehicle system. The systems and methods described herein may be configured to parse each of the faults of the plurality of faults by subsystem of the steering system. The systems and methods described herein may be configured to determine, for a respective fault of the plurality of faults, whether the respective fault is associated with at least one existing diagnostic trouble code based on fault code requirement information.

The systems and methods described herein may be configured to, in response to a determination that the respective fault is associated with at least one existing diagnostic trouble code, associate, in a fault database, the at least one existing diagnostic trouble code with the respective fault. The systems and methods described herein may be configured to, in response to a determination that the respective fault is not associated with at least one existing diagnostic trouble code, generate diagnostic information for the respective fault. The systems and methods described herein may be configured to generate the diagnostic information for the respective fault using available data, using a physics based model, using any other suitable technique, or a combination thereof. The systems and methods described herein may be configured to associate the diagnostic information for the respective fault with the respective fault in the fault database.

In some embodiments, the systems and methods described herein may be configured to generate, for a vehicle system, a fault model including a plurality of faults using design failure mode and effect analysis information. The vehicle system may include a steering system and/or other suitable vehicle system. The steering system may include any suitable steering system, such as an EPS steering system, a SbW steering system, or any other suitable steering system.

The systems and methods described herein may be configured to parse each of the faults of the plurality of faults by subsystem of the vehicle system. The systems and methods described herein may be configured to determine, for a respective fault of the plurality of faults, whether the respective fault is associated with at least one existing diagnostic trouble code based on fault code requirement information. The systems and methods described herein may be configured to, in response to a determination that the respective fault is associated with at least one existing diagnostic trouble code, associate, in a fault database, the at least one existing diagnostic trouble code with the respective fault.

In some embodiments, the systems and methods described herein may be configured to, in response to a determination that the respective fault is not associated with at least one existing diagnostic trouble code, generate, using at least one of available data and a physics based model, diagnostic information for the respective fault. The systems and methods described herein may be configured to associate the diagnostic information for the respective fault with the respective fault in the fault database.

Figure 1:
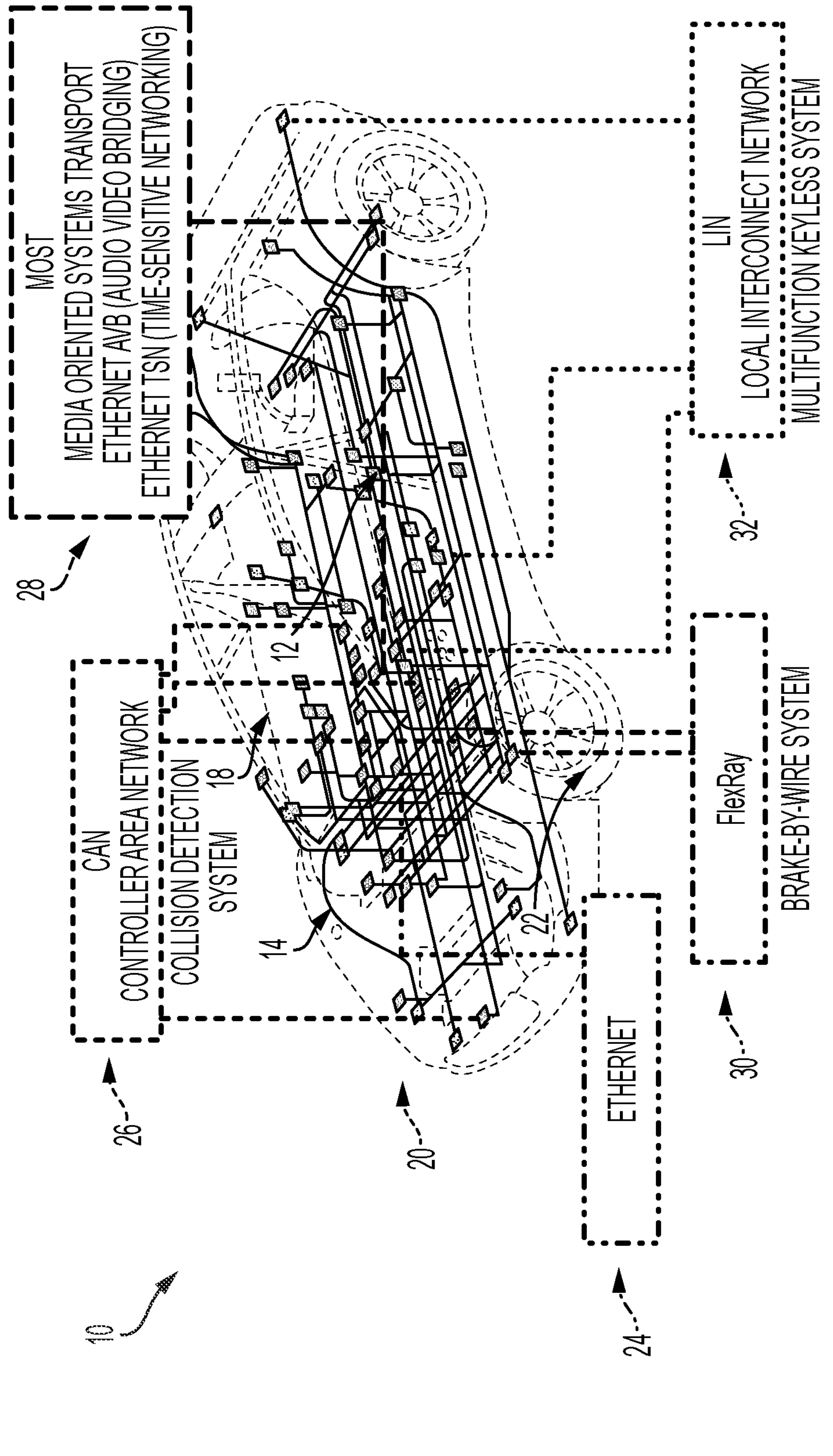
FIG. 1 generally illustrates a vehicle according to the principles of the present disclosure.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), or other suitable steering system. The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof. Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 2:
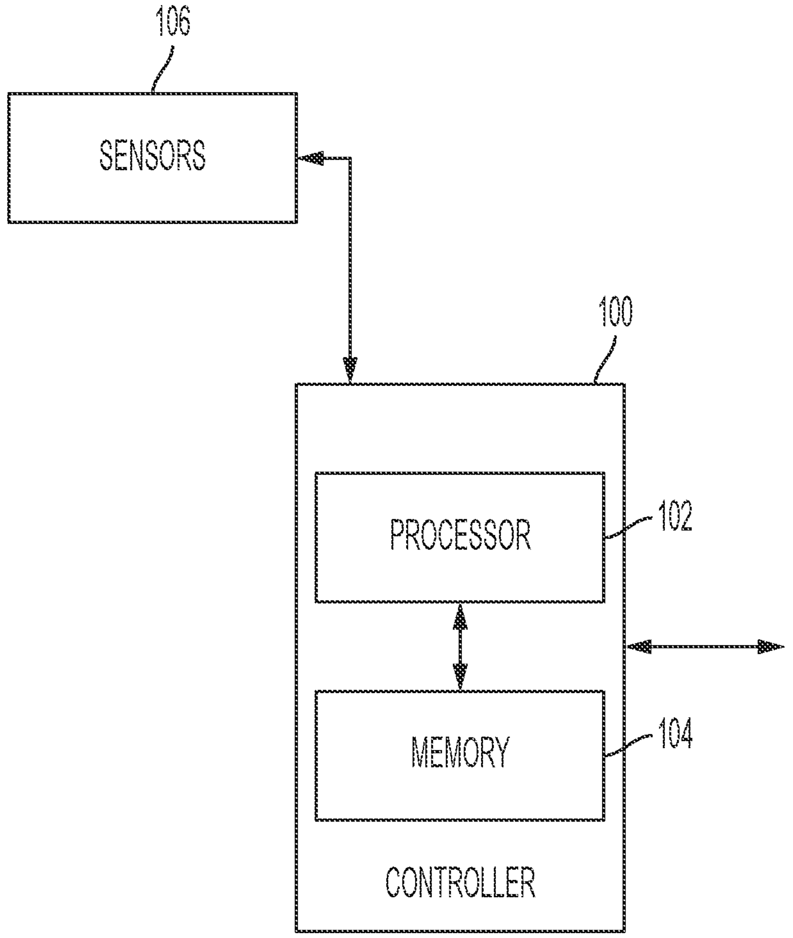
FIG. 2 generally illustrates a control system including a controller according to the principles of the present disclosure.

In some embodiments, the vehicle 10 may include a controller, such as controller 100, as is generally illustrated in FIG. 2. The controller 100 may include any suitable controller, such as an electronic control unit or other suitable controller. The controller 100 may be configured to control, for example, the various functions of the steering system and/or various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angel, a motor velocity, a vehicle speed, other suitable information, or a combination thereof In some embodiments, controller 100 may be configured to provide an enhanced fault model for a diagnostic reasoner. For example, the controller 100 may generate, for a vehicle system (e.g., such as the steering system or other suitable vehicle system including, but not limited to those described herein), a fault model including a plurality of faults using design failure mode and effect analysis information. The controller 100 may parse each of the faults of the plurality of faults by subsystem of the vehicle system. The controller 100 may determine, for a respective fault of the plurality of faults, whether the respective fault is associated with at least one existing diagnostic trouble code based on fault code requirement information.

If the controller 100 determines that the respective fault is associated with at least one existing diagnostic trouble code, the controller 100 may associate, in a fault database, the at least one existing diagnostic trouble code with the respective fault. The fault database may include any suitable database. The fault database may be remotely located from the controller 100 and/or the vehicle 10, proximately located with the controller 100 and/or the vehicle 10, or disposed in any suitable location relative to the controller 100 and/or the vehicle 10.

If the controller 100 determines that the respective fault is not associated with at least one existing diagnostic trouble code, the controller 100 may generate diagnostic information for the respective fault. The controller 100 may generate the diagnostic information for the respective fault using available data, using a physics based model, using any other suitable technique, or a combination thereof. The controller 100 may associate the diagnostic information for the respective fault with the respective fault in the fault database.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

Figure 5:
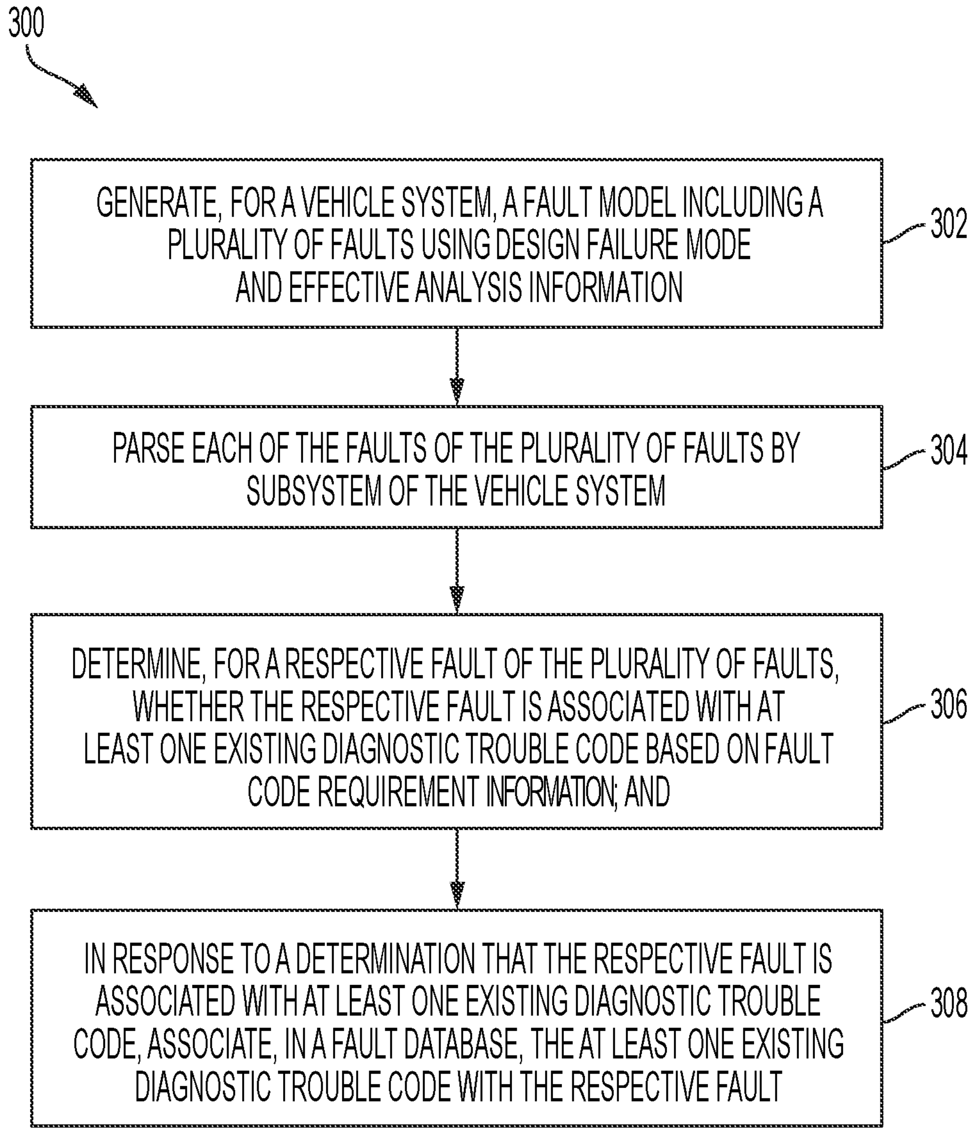
FIG. 5 is a flow diagram generally illustrating fault management method according to the principles of the present disclosure.

FIG. 5 is a flow diagram generally illustrating a fault management method 300 according to the principles of the present disclosure. At 302, the method 300 generates, for a vehicle system, a fault model including a plurality of faults using design failure mode and effect analysis information. For example, the controller 100 may generate the fault model including the plurality of faults using the DFMEA information.

At 304, the method 300 parses each of the faults of the plurality of faults by subsystem of the vehicle system. For example, the controller 100 may parse each of the faults of the plurality of faults by subsystem of the steering system.

At 306, the method 300 determines, for a respective fault of the plurality of faults, whether the respective fault is associated with at least one existing diagnostic trouble code based on fault code requirement information. For example, the controller 100 may determine, or the respective fault of the plurality of faults, whether the respective fault is associated with at least one existing diagnostic trouble code based on the fault code requirement information.

A 308, the method 300, in response to a determination that the respective fault is associated with at least one existing diagnostic trouble code, associates, in a fault database, the at least one existing diagnostic trouble code with the respective fault. For example, the controller 100, in response to a determination that the respective fault is associated with at least one existing diagnostic trouble code, associates, in the fault database, the at least one existing diagnostic trouble code with the respective fault.

In some embodiments, a method for vehicle fault management includes generating, for a steering system, a fault model including a plurality of faults using design failure mode and effect analysis information and parsing each of the faults of the plurality of faults by subsystem of the steering system. The method also includes determining, for a respective fault of the plurality of faults, whether the respective fault is associated with at least one existing diagnostic trouble code based on fault code requirement information. The method also includes, in response to a determination that the respective fault is associated with at least one existing diagnostic trouble code, associating, in a fault database, the at least one existing diagnostic trouble code with the respective fault.

In some embodiments, the method also includes, in response to a determination that the respective fault is not associated with at least one existing diagnostic trouble code, generating diagnostic information for the respective fault. In some embodiments, generating the diagnostic information for the respective fault includes using available data. In some embodiments, generating the diagnostic information for the respective fault includes using a physics based model. In some embodiments, the method also includes associating the diagnostic information for the respective fault with the respective fault in the fault database.

In some embodiments, a system for vehicle fault management includes a processor and a memory. The memory includes instructions that, when executed by the processor, cause the processor to: generate, for a steering system, a fault model including a plurality of faults using design failure mode and effect analysis information; parse each of the faults of the plurality of faults by subsystem of the steering system; determine, for a respective fault of the plurality of faults, whether the respective fault is associated with at least one existing diagnostic trouble code based on fault code requirement information; and, in response to a determination that the respective fault is associated with at least one existing diagnostic trouble code, associate, in a fault database, the at least one existing diagnostic trouble code with the respective fault.

In some embodiments, the instructions further cause the processor to, in response to a determination that the respective fault is not associated with at least one existing diagnostic trouble code, generate diagnostic information for the respective fault. In some embodiments, generating the diagnostic information for the respective fault includes using available data. In some embodiments, generating the diagnostic information for the respective fault includes using a physics based model. In some embodiments, the instructions further cause the processor to associate the diagnostic information for the respective fault with the respective fault in the fault database.

In some embodiments, a method for vehicle fault management includes generating, for a vehicle system, a fault model including a plurality of faults using design failure mode and effect analysis information and parsing each of the faults of the plurality of faults by subsystem of the vehicle system. The method also includes determining, for a respective fault of the plurality of faults, whether the respective fault is associated with at least one existing diagnostic trouble code based on fault code requirement information and, in response to a determination that the respective fault is associated with at least one existing diagnostic trouble code, associating, in a fault database, the at least one existing diagnostic trouble code with the respective fault.

In some embodiments, the method also includes, in response to a determination that the respective fault is not associated with at least one existing diagnostic trouble code, generating diagnostic information for the respective fault. In some embodiments, generating the diagnostic information for the respective fault includes using available data. In some embodiments, generating the diagnostic information for the respective fault includes using a physics based model. In some embodiments, the method also includes associating the diagnostic information for the respective fault with the respective fault in the fault database. In some embodiments, the vehicle system includes a steering system. In some embodiments, the steering system includes an electronic power steering system. In some embodiments, the steering system includes a steer-by-wire steering system.

In some embodiments, a system for vehicle fault management includes a processor and a memory. The memory includes instructions that, when executed by the processor, cause the processor to: generate, for a vehicle system, a fault model including a plurality of faults using design failure mode and effect analysis information; parse each of the faults of the plurality of faults by subsystem of the vehicle system; determine, for a respective fault of the plurality of faults, whether the respective fault is associated with at least one existing diagnostic trouble code based on fault code requirement information; and, in response to a determination that the respective fault is associated with at least one existing diagnostic trouble code, associate, in a fault database, the at least one existing diagnostic trouble code with the respective fault.

In some embodiments, the instructions further cause the processor to, in response to a determination that the respective fault is not associated with at least one existing diagnostic trouble code, generate diagnostic information for the respective fault. In some embodiments, generating the diagnostic information for the respective fault includes using available data. In some embodiments, generating the diagnostic information for the respective fault includes using a physics based model. In some embodiments, the instructions further cause the processor to associate the diagnostic information for the respective fault with the respective fault in the fault database. In some embodiments, the vehicle system includes a steering system. In some embodiments, the steering system includes an electronic power steering system. In some embodiments, the steering system includes a steer-by-wire steering system.

In some embodiments, an apparatus for vehicle fault management includes a processor and a memory. The memory includes instructions that, when executed by the processor, cause the processor to: generate, for a vehicle system, a fault model including a plurality of faults using design failure mode and effect analysis information; parse each of the faults of the plurality of faults by subsystem of the vehicle system; determine, for a respective fault of the plurality of faults, whether the respective fault is associated with at least one existing diagnostic trouble code based on fault code requirement information; in response to a determination that the respective fault is associated with at least one existing diagnostic trouble code, associate, in a fault database, the at least one existing diagnostic trouble code with the respective fault; and, in response to a determination that the respective fault is not associated with at least one existing diagnostic trouble code, generate, using at least one of available data and a physics based model, diagnostic information for the respective fault, and associate the diagnostic information for the respective fault with the respective fault in the fault database.

In some embodiments, the vehicle system includes a steering system. In some embodiments, the steering system includes an electronic power steering system. In some embodiments, the steering system includes a steer-by-wire steering system.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for vehicle fault management, the method comprising:

generating, for a subsystem of a vehicle system of a vehicle, a fault model including a plurality of faults and a plurality of symptoms using design failure mode and effect analysis information, wherein the fault model is configured to provide input to a diagnostic reasoner, and wherein the fault model is generated each time the subsystem of the vehicle system of the vehicle is in use;

parsing, each time the subsystem of the vehicle system is in use, each of the faults of the plurality of faults by subsystem of the vehicle system;

determining, for a respective fault associated with the subsystem of the vehicle system, whether the respective fault is associated with at least one existing diagnostic trouble code based on fault code requirement information;

in response to a determination that the respective fault is associated with at least one existing diagnostic trouble code, associating, in a fault database, the at least one existing diagnostic trouble code with the respective fault; and identifying, using the diagnostic reasoner, at least one potential fault in the vehicle system based on the input provided by the fault model and the fault database.

2. The method of claim 1, further comprising, in response to a determination that the respective fault is not associated with at least one existing diagnostic trouble code, generating diagnostic information for the respective fault.

3. The method of claim 2, wherein generating the diagnostic information for the respective fault includes using available data.

4. The method of claim 2, wherein generating the diagnostic information for the respective fault includes using a physics based model.

5. The method of claim 2, further comprising associating the diagnostic information for the respective fault with the respective fault in the fault database.

6. The method of claim 1, wherein the input from the fault model includes one or more one-to-one relationships between a fault of the plurality of faults and a symptom of the plurality of symptoms.

7. The method of claim 1, wherein the vehicle system includes a steering system.

8. The method of claim 7, wherein the steering system includes an electronic power steering system.

9. A system for vehicle fault management, the system comprising:

a processor; and a memory including instructions that, when executed by the processor, cause the processor to:

generate, for a subsystem of a vehicle system of a vehicle, a fault model including a plurality of faults using design failure mode and effect analysis information and wherein the fault model is generated each time the subsystem of the vehicle system of the vehicle is in use;

parse, each time the subsystem of the vehicle system is in use, each of the faults of the plurality of faults by subsystem of the vehicle system;

determine, for a respective fault associate with the subsystem of the vehicle system, whether the respective fault is associated with at least one existing diagnostic trouble code based on fault code requirement information;

in response to a determination that the respective fault is associated with at least one existing diagnostic trouble code, associate, in a fault database, the at least one existing diagnostic trouble code with the respective fault; and identify, using a diagnostic reasoner, at least one potential fault in the vehicle system based on the input provided by the fault model and the fault database.

10. The system of claim 9, wherein the instructions further cause the processor to, in response to a determination that the respective fault is not associated with at least one existing diagnostic trouble code, generate diagnostic information for the respective fault.

11. The system of claim 10, wherein generating the diagnostic information for the respective fault includes using available data.

12. The system of claim 10, wherein generating the diagnostic information for the respective fault includes using a physics based model.

13. The system of claim 10, wherein the instructions further cause the processor to associate the diagnostic information for the respective fault with the respective fault in the fault database.

14. The system of claim 9, wherein the input from the fault model includes one or more one-to-one relationships between a fault of the plurality of faults and a symptom of the plurality of symptoms.

15. The system of claim 9, wherein the vehicle system includes a steering system.

16. The system of claim 15, wherein the steering system includes an electronic power steering system.

17. An apparatus for vehicle fault management, the apparatus comprising:

a processor; and a memory including instructions that, when executed by the processor, cause the processor to:

generate, for a subsystem of a vehicle system of a vehicle, a fault model including a plurality of faults using design failure mode and effect analysis information and wherein the fault model is generated each time the subsystem of the vehicle system of the vehicle is in use;

parse, each time the subsystem of the vehicle system is in use, each of the faults of the plurality of faults by subsystem of the vehicle system;

determine, for a respective fault associated with the subsystem of the vehicle system, whether the respective fault is associated with at least one existing diagnostic trouble code based on fault code requirement information;

in response to a determination that the respective fault is associated with at least one existing diagnostic trouble code, associate, in a fault database, the at least one existing diagnostic trouble code with the respective fault;

in response to a determination that the respective fault is not associated with at least one existing diagnostic trouble code:

generate, using at least one of available data and a physics based model, diagnostic information for the respective fault, and associate the diagnostic information for the respective fault with the respective fault in the fault database; and identify, using a diagnostic reasoner, at least one potential fault in the vehicle system based on the input provided by the fault model and the fault database.

18. The apparatus of claim 17, wherein the input from the fault model includes one or more one-to-one relationships between a fault of the plurality of faults and a symptom of the plurality of symptoms.

19. The apparatus of claim 17, wherein the vehicle system includes a steering system.

20. The apparatus of claim 19, wherein the steering system includes an electronic power steering system.

* * * * *